United States Patent
Willing et al.

(10) Patent No.: US 12,433,798 B2
(45) Date of Patent: Oct. 7, 2025

(54) ELASTIC NAPPY ELEMENT

(71) Applicant: RKW SE, Mannheim (DE)

(72) Inventors: Christoph Willing, Vreden (DE); Paul Waller, Rosenheim (DE); Michael Scherer, Flintsbach im Inn (DE)

(73) Assignee: RKW SE, Mannheim (DE)

( * ) Notice: Subject to any disclaimer, the term of this patent is extended or adjusted under 35 U.S.C. 154(b) by 813 days.

(21) Appl. No.: 17/285,647

(22) PCT Filed: Aug. 22, 2019

(86) PCT No.: PCT/DE2019/100754
§ 371 (c)(1),
(2) Date: Apr. 15, 2021

(87) PCT Pub. No.: WO2020/108679
PCT Pub. Date: Jun. 4, 2020

(65) Prior Publication Data
US 2021/0393445 A1    Dec. 23, 2021

(30) Foreign Application Priority Data

Nov. 28, 2018   (DE) .......................... 102018130054.9

(51) Int. Cl.
*A61F 13/15*    (2006.01)
*A61F 13/49*    (2006.01)
*A61F 13/539*   (2006.01)

(52) U.S. Cl.
CPC .. *A61F 13/15699* (2013.01); *A61F 13/49012* (2013.01); *A61F 13/49015* (2013.01); *A61F 13/4902* (2013.01); *A61F 13/539* (2013.01); *A61F 2013/15861* (2013.01); *A61F 2013/15951* (2013.01); *A61F 2013/15967* (2013.01)

(58) Field of Classification Search
CPC .... A61F 13/15; A61F 13/49; A61F 13/15699; A61F 13/49012; A61F 13/49015; A61F 13/4902; A61F 13/359; A61F 13/15593; A61F 13/49014; A61F 2013/15861; A61F 2013/15951; A61F 2013/15967; B32B 27/32; B32B 27/12; B32B 5/26; B32B 5/142; B32B 5/022; B32B 2555/02;
(Continued)

(56) References Cited

U.S. PATENT DOCUMENTS

| | | | |
|---|---|---|---|
| 2002/0016122 A1* | 2/2002 | Curro | A61Q 19/00 428/103 |
| 2006/0162843 A1 | 7/2006 | Baldauf et al. | |

(Continued)

FOREIGN PATENT DOCUMENTS

| | | |
|---|---|---|
| DE | 10304370 | 8/2004 |
| EP | 0719533 | 7/1996 |

(Continued)

*Primary Examiner* — Adam Marcetich
*Assistant Examiner* — Timothy L Flynn
(74) *Attorney, Agent, or Firm* — Volpe Koenig

(57) ABSTRACT

An elastic nappy element that includes an elastic layer (1) and outer layers (2, 3) made of a non-woven fabric. The nappy element has connecting regions (4, 8) for connecting the outer layers (2, 3) to the elastic layer (1). These connecting regions (4, 8) include zones (7, 9) in which a form-fitting bond of non-woven material and solidified material of the elastic layer (1) is formed.

16 Claims, 1 Drawing Sheet

(58) Field of Classification Search
CPC ............ B32B 2307/51; B32B 2255/02; B32B 2250/44; B32B 2250/40; B29C 65/08; B29C 65/16

See application file for complete search history.

(56) References Cited

U.S. PATENT DOCUMENTS

| | | | |
|---|---|---|---|
| 2010/0062221 A1* | 3/2010 | Hoenigmann | .......... B32B 38/06 442/329 |
| 2019/0254885 A1* | 8/2019 | Takeuchi | .......... A61F 13/15739 |

FOREIGN PATENT DOCUMENTS

| | | |
|---|---|---|
| EP | 0721770 | 7/1996 |
| EP | 0714351 | 12/1998 |
| EP | 1686209 | 8/2006 |
| EP | 1921192 | 5/2008 |
| EP | 2228200 | 9/2010 |
| EP | 2406070 | 1/2012 |
| EP | 2951016 | 10/2017 |
| EP | 3082702 | 10/2018 |
| WO | 9525496 | 9/1995 |
| WO | 9622065 | 7/1996 |
| WO | 2006024394 | 3/2006 |

* cited by examiner

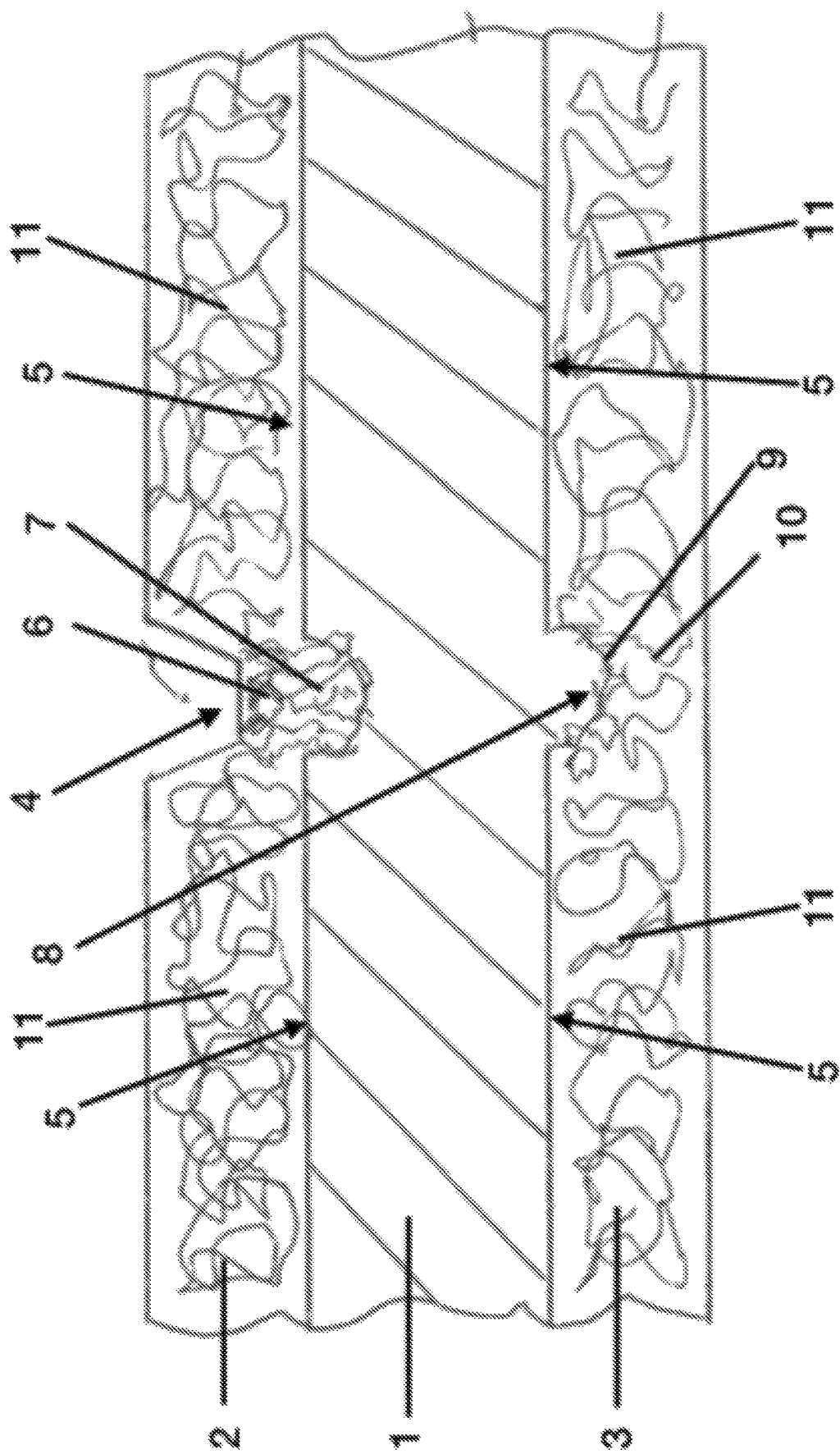

ELASTIC NAPPY ELEMENT

TECHNICAL FIELD

The invention relates to an elastic diaper element having an elastic layer and outer layers of nonwoven.

BACKGROUND

Different closure systems are used for diapers. The closing is effected either with an adhesive tape on a film or with a hooked tape (hook) on a looped layer (loop). Hook-and-loop variants enjoy a relatively great degree of appreciation among users, since these closure systems are also known in the form of hook-and-loop closures from clothing.

In the case of products for temporary use, less expensive hook-and-loop variants are used. Such closure connections for diapers are described, for example, in WO 96/22065, EP 719 533, EP 721 770 and WO 95/25496.

Many diaper closure systems comprise a fibrous material which sits on the waistband, what is known as the landing zone, and a diaper ear as counter-piece. The diaper ear consists of a multilayered laminate and has, on at least one side, a material which catches in the landing zone when the diaper is being closed.

To increase the wearing comfort, these diaper-ear laminates contain elastic components which ensure a fit to the shape of the body by virtue of the restoring force of the elastic portion. The elastic components, which are introduced usually in the form of films, are provided with textile covering materials for a pleasant haptic sensation.

Studies show that, when closing a diaper ear, a maximum force of approx. 10 N is built up. After the extensional stress, the diaper ear largely resets again due to its elasticity. The range of between 0 and 100% elongation, i.e. between 0 and 10 N, is referred to as the functional range.

The conventional methods for producing laminates from an elastic film and a nonwoven are thermal bonding or adhesive bonding.

In the case of thermal bonding, for the connection, the material of film and nonwoven is melted by high temperature and pressure by means of an embossing roller (=gravure steel roller). The method has the disadvantage that the films can become damaged and what is known as "pinholing" can arise. Moreover, this method only leads to a punctiform connection.

To produce virtually all commercial diaper elements, nowadays adhesives are also used. These adhesives additionally lead to odor effects, for example by releasing styrenes.

Children wear diapers for many years and frequently 24 hours per day. The requirement therefore exists that diapers should be free of harmful substances as far as possible. In conventional diapers, it was previously the case that dispensing with adhesive in the diaper ears could hardly be avoided. In almost all conventional diaper ears, it was previously the case that the upper and lower nonwoven layer had been connected to the elastic film lying therebetween using adhesives.

The use of adhesives is also harmful for ecological reasons. It is estimated that per year, more than 22 000 tons of adhesive are used to produce diaper ears. Moreover, the use of such adhesives is associated with additional costs.

EP 3 082 702 B1 describes a method for forming an elastic nonwoven laminate. The laminate is guided through a first gap between two rollers. One roller has grooves. The laminate is then guided through a second gap, which is formed by binding rollers. The binding rollers are provided with a pattern. The pattern preferably covers ten to 60% of the overall surface of the outer side of the nonwoven.

EP 2 951 016 B1 describes a method for producing a laminate without adhesive. A substrate of a thermoplastic layer and layers of nonwoven fabric applied on top thereof are connected by supplying heat into a thermoplastic layer via infrared radiation and subsequent pressing and a following cooling operation to form a laminate.

DE 103 04 370 B4 describes a method for producing transversely elastic material sheets which consist of a flexible, elastic carrier film of a polymer, wherein a nonwoven sheet is applied to the top and bottom side of the carrier film. The connection to form a laminate is effected via weld connections in the form of spot-welding surfaces arranged in the manner of a grid.

EP 0 714 351 B1 describes a method for producing a film from a fibrous nonwoven and an elastomeric film. The elastomeric film is connected to the nonwoven in a connecting unit. In the process, an elastomeric extrudate is extruded at a temperature above its softening point, the pinching rollers used here producing a planar connection between the elastomeric film and the nonwoven. The laminate is subsequently subjected to a stretching process. What is produced in this method is a planar sheet material made of the elastic layer and the nonwoven fabric. The elastic layer is connected to the nonwoven over the overall surface of the laminate. Such a laminate can be activated only insufficiently.

EP 1 921 192 A1 describes a multilayered elastic material sheet of nonwoven fabrics and polymer films. After an extrusion and prior to the connection to the polymer film, at least one nonwoven layer is bonded using water jets, with the result that said nonwoven layer can be extended easily in the transverse direction and the material sheet can be elastically deformed.

EP 2 228 200 A1 describes an elastic laminate for diaper closure elements. The elastic laminate comprises outer layers of nonwoven, between which an elastic film is laminated in at least in certain regions. One of the two outer layers consists of a nonwoven fabric bonded by water jets. The nonwoven fabric is stretched in an axial direction in the region of the elastic film.

EP 2 406 070 B2 describes an elastic laminate for diaper closure elements. Said elastic laminate comprises outer layers of nonwoven with an elastic film laminated in between the outer layers. One of the two outer layers consists of a water-jet-bonded nonwoven fabric which is stretched in an axial direction. The layers of the elastic laminate are connected by ultrasonic spot welds or adhesive.

WO 2006/024394 A1 describes a method for producing nonwoven film laminates for hygiene-related articles. A starting nonwoven sheet is guided with a starting film sheet onto a heating cylinder. There, both sheets are heated together to a temperature above the crystallite melting point of the film sheet and below the crystallite melting point of the nonwoven sheet. The nonwoven sheet comes to lie against the cylinder. The composite formed on the heating cylinder is then fixed and cooled in an embossing mechanism. The embossing mechanism consists of an embossing roller and a rubber roller. The composite is then fed to a stretching operation. The stretching is effected by ring rolling rollers in the transverse direction.

SUMMARY

It is an object of the invention to specify an elastic diaper element which is harmless in terms of health and is ecologically sustainable. The diaper element should not release any odors. Moreover, it should have good tear resistance and an optimum extension profile. Furthermore, it should provide pleasant haptics and, when extended, oppose a resistance which is sufficient but not too high, with the result that an extensional stress is perceived as pleasant for the user. In this respect, the structures of the individual layers should not become thermally damaged, in order that the mechanical properties of the laminate are retained. After the extensional stress lapses, the laminate should substantially reset again on account of its elasticity. The diaper element should ensure a pleasant wearing comfort and a favorable fit.

This object is achieved according to the invention by a diaper element, a method and a use including one or more features as described herein. Preferred variants can be derived from the claims, the description, the exemplary embodiment and the drawing.

According to the invention, the diaper element has connecting regions, aligned in a targeted manner, of the nonwoven outer layers to the elastic layer. These connecting regions comprise zones in which nonwoven material is present in solidified material of the elastic layer. The elastic layer is introduced by cast film extrusion (cast extrusion) between the nonwoven outer layers, wherein the connection of the layers is effected by a structured roller, which according to the invention forms connecting regions in a targeted manner by pressing thermally uninfluenced nonwoven material into the molten elastic layer at selected positions and/or molten elastic material into a nonwoven layer.

According to the invention, such a laminate is used as diaper element. In this respect, use as a diaper closure element, preferably as a diaper ear, has proven to be advantageous in particular. The laminate is also suitable for use as a diaper waistband, which comprises at least partially elastic strips of the laminate.

The production of the laminate does not require any further energy apart from the melting capacity of the extruder. The melt cools between rollers. As a result, the melt solidifies and the connecting regions according to the invention are formed, which are provided in such a way that the nonwoven layers do not undergo any thermal loading from the outside, as would be the case for example in ultrasonic welding or a heating roller. This alleviates pinholing. According to the invention, no adhesives at all are necessary to produce the laminate.

As a result of the selective heating of the elastic layer by cast extrusion with simultaneous generation of a hot stream from the inside outward during the connecting step itself over the nonwoven outer layers, the supporting structure of the elastic layer is retained. By ensuring a hot stream from the inside outward during the connecting operation itself, a laminate is provided which has particularly favorable properties as a diaper ear.

The hot stream from the inside outward can be controlled in a targeted manner here. In a particularly favorable embodiment of the invention, at least one cooling roller is used for this purpose. By lowering the surface temperature of the cooling roller, the stream of the heat energy which flows from the inside outward can be increased specifically to provide an optimum diaper ear or diaper waistband laminate.

After the extrusion, the elastic polymer film is present in a molten state preferably above a temperature of 210° C. Cooling by more than 100° C., preferably by more than 150° C. and in particular by more than 160° C. preferably takes place during the connecting step by way of a roller, with the result that after the first roller pair, which is used for connecting the layers, the laminate is present almost at room temperature.

In one variant of the invention, during the connecting step, rollers with a different surface temperature are used. Through, the hot stream can be subdivided, with the result that a larger hot stream flows outward over one nonwoven layer than over the other nonwoven layer. A favorable ratio of the two outwardly flowing quantities of heat makes it possible for optimum properties to be provided in the laminate for use as a diaper ear or diaper waistband.

The cooling rollers can be equipped with elevations and thus bring about an embossing effect. It is also possible to use two cooling rollers. It is also possible for a smooth cooling roller to interact with a roller which has elevations and is not cooled, or a cooling roller with elevations to interact with a smooth, non-cooled counter-roller. The rollers can consist for example of a metallic and/or rubber-like material.

According to the invention, the laminate has connecting regions to nonwoven material and solidified elastic material. After extrusion of the elastic material between the nonwoven sheets, in selected regions nonwoven material which is still in the molten state is pressed into the elastic layer. Zones are produced in which nonwoven material is present in a form fit in solidified material of the elastic layer. Connecting regions of solidified elastic material and nonwoven that are aligned in a targeted manner are thus provided. By contrast to conventional methods, pressing over the overall surface does not take place.

The connecting regions according to the invention are preferably of strip-like and/or web-like and/or groove-like and/or rhomboidal form. The connecting regions can be formed as a plurality of rows arranged one behind the other. Within one row, a straight and/or wavy profile is possible. The alignment of the connecting regions is preferably perpendicular to the tension direction of the diaper ear or diaper waistband, with the result that the individual rows are aligned transversely to the tension direction of the diaper ear or diaper waistband.

What is important for an optimum diaper ear laminate or diaper waistband laminate is the ratio of the raised regions to the sunken regions, said ratio also being referred to as a web-to-groove ratio in the case of the structured rollers used.

The connecting regions preferably comprise less than 90% of the overall surface of the laminate. In a particularly favorable embodiment of the invention, the inventive regions may even be less than 80%, preferably less than 70%, in particular less than 60% of the overall surface of the laminate. In addition, the connecting regions preferably comprise more than 10%, preferably more than 20%, in particular more than 30% of the overall surface of the laminate.

It has proven to be particularly favorable when connecting regions have a width of more than 0.1 mm, preferably more than 0.3 mm, in particular more than 0.6 mm and/or a width of less than 8 mm, preferably less than 6 mm, in particular less than 4 mm. The connecting regions are preferably aligned in the manner of strips transversely to the tension direction of the diaper ear or diaper waistband.

Surprisingly, it has been found that a laminate which has been pressed in a targeted manner in certain regions is exceptionally well suited for use as a diaper ear or diaper waistband. During the activation, an optimum overextension of a nonwoven layer in the transverse direction is possible as a result, wherein, inside this nonwoven layer, a large proportion of the existing internal bonding points between the nonwoven fibers is broken up. At the same time, the other nonwoven layer undergoes an orientation in the transverse direction by aligning the fiber web transversely to the tension direction of the diaper ear or diaper waistband and remains load bearing for application as a diaper ear or diaper waistband.

In a preferred variant of the invention, the connecting regions have external zones, in which the nonwoven material of the outer layers is present in a compacted but not completely melted state and/or in which the nonwoven material of the outer layers is present in a non-molten state.

Arranged between the connecting regions are regions in which fibers of the respective nonwoven layer to a predominant extent are not present in a form-fitting composite with elastic material. These regions contribute only negligibly to the connection of the individual layers, since a weak cohesion between the elastic layer and the respective nonwoven layer is present only at the direct contact surface.

These "non-binding regions" preferably have a proportion of more than 10%, in particular more than 20%, preferably more than 30% of the overall surface. It is preferably the case that, in these regions, more than 50%, preferably more than 65%, in particular more than 80% of the fibers are not present in a form-fitting composite with material of the elastic layer.

It has proven to be particularly favorable when these non-binding regions have a width of more than 0.1 mm, preferably more than 0.3 mm, in particular more than 0.6 mm and/or a width of less than 8 mm, preferably less than 6 mm, in particular less than 4 mm. The non-binding regions are preferably aligned in the manner of strips transversely to the tension direction of the diaper ear or diaper waistband.

Preferably rollers are used to provide the connecting regions with a surface structure with a height of the elevations of more than 100 µm, preferably more than 300 µm, in particular more than 500 µm and/or less than 1.8 mm, preferably less than 1.6 mm, in particular less than 1.4 mm.

In a particularly advantageous embodiment of the invention, at least one nonwoven layer consists of a carded nonwoven fabric. During the production of nonwoven fabrics, the carding serves for the first alignment of the loose textile fibers to form a nonwoven fabric. The carded nonwoven fabric used preferably consists of polypropylene fibers and/or of mixtures of different fiber types, such as for example of polypropylene/viscose, polypropylene/polyamide, polypropylene/polyester, etc. According to the invention, present in the finished diaper ear or diaper waistband to a predominant extent in a broken-up state are the bindings which were originally present within the carded nonwoven layer.

By contrast, the other nonwoven layer remains in its basic structure and forms a functional, load-bearing nonwoven. According to the invention, the second nonwoven layer consists of a water-jet-bonded nonwoven fabric. Bonding by the use of water jets confers a high extensibility in the transverse direction on this layer of nonwoven fabric. Hydroentanglement reorients the fibers in the nonwoven fabric such that the original two-dimensional fiber alignment is converted into a three-dimensional fiber orientation. The fibers are bonded into the nonwoven to a more pronounced extent. This nonwoven layer preferably has a specific weight of 5-80 g/m², preferably of 10-70 g/m², in particular of 15-25 g/m².

The water-jet-bonded nonwoven-fabric layer preferably involves nonwoven fabrics of endless filaments. Due to the production process thereof, said nonwoven fabrics provide a fiber web which is formed in the manner of a loop and thus the hooks with a sufficient means of anchoring.

As material for producing the endless filaments, it is possible to use spinnable polymers, such as for example polyesters, PLA, polyolefins, in particular polypropylene and polyethylene. They particularly preferably consist of polypropylene material and/or polyethylene material.

The elastic layer is preferably a polypropylene-polyethylene block copolymer. The elastic film in particular has a specific weight of 5-140 g/m², preferably of from 10 to 130 g/m², preferably of 20-40 g/m². According to the invention, styrene-containing polymers are completely dispensed with.

BRIEF DESCRIPTION OF THE DRAWINGS

Further advantages and features of the invention will become apparent from the description of one exemplary embodiment with reference to a drawing and from the drawing itself.

The sole FIGURE shows a section through a diaper element according to one embodiment.

DETAILED DESCRIPTION

The FIGURE shows a section through a diaper element according to the invention. The laminate comprises an elastic layer 1 which is arranged between two outer layers 2, 3 of nonwoven. The nonwoven layer 2 which is at the top when looking at the drawing is a water-jet-bonded nonwoven fabric in the exemplary embodiment, a spun nonwoven of endless filaments being used.

The second nonwoven layer 3 is a carded nonwoven fabric, which was originally bonded to binding points prior to the processing to form the laminate. In the process, a technique is used which is referred to as thermal bonding. Thermal bonding is a process for the thermal bonding of nonwoven fabrics. As a result, the binding strength is considerably increased and it is also possible to design lightweight nonwoven fabrics. According to the invention, when producing the laminate in an activation step in which the laminate is preferably stretched by ring rolling in the transverse direction, these internal bindings of the carded nonwoven layer 3 are largely destroyed.

At the same time, during the activation, the other nonwoven layer 2 of the water-jet-bonded nonwoven fabric remains functional and load bearing. During the activation, in the nonwoven layer 2, the water-jet-bonded endless filaments are oriented in the transverse direction.

The laminate according to the invention has optimum performance as a diaper ear or diaper waistband, since on the one hand it can be extended well, but nevertheless generates an adequate counter force, with the result that the customer has a pleasant sensation when stretching the diaper ear or diaper waistband.

When it is being closed, the diaper ear preferably builds up a maximum force of approx. 10 N. After the extensional stress lapses, the diaper ear according to the invention largely resets again due to its elasticity.

If the diaper element according to the invention is designed as a diaper ear, it preferably has a width of between 30 and 120 mm, in particular between 40 and 100 mm, preferably between 50 and 80 mm and/or a length of preferably between 40 and 200 mm, in particular between 60 and 180 mm, preferably between 80 and 160 mm.

If the diaper element according to the invention is designed as a diaper waistband, it has proven to be particularly advantageous when the diaper waistband has elastic strips of the laminate according to the invention at least in certain regions. The diaper waistband preferably has a width of between 10 and 160 mm, in particular between 20 and 140 mm, preferably between 30 and 120 mm, and/or an overall length of preferably between 300 and 800 mm, in particular between 400 and 600 mm. If the diaper waistband is provided with elastic strips of the laminate according to the invention, these strips preferably have a length of between 40 and 200 mm, in particular between 60 and 180 mm, preferably between 80 and 160 mm.

In the exemplary embodiment, monofilms of elastic polyolefins are used as elastic layer 1. These are preferably thermoplastic polymers. Used in particular in this respect are polypropylene-polyethylene block copolymers, for example of the series Exxon Vistamaxx (PP-based): VM 6102, or VM 6202 or VM 7810 and/or the series Dow INFUSE (PE-based): INFUSE 9507, INFUSE 9107.

According to the invention, incorporated in the laminate in a targeted manner are connecting regions 4, which have a much stronger binding between the individual layers 1, 2 and 3 of the laminate than the regions 5. The active binding forces between the layers 1, 2 and 3 are greater by more than a factor of 3, preferably by a factor of 5, in particular by more than a factor of 10, in the connecting regions 4 than in the regions 5.

In the connecting regions 4, the nonwoven material is pressed into the molten material of the elastic layer 1, wherein, according to the invention, during the connecting operation no heat is supplied from the outside. The connecting regions 4 according to the invention have different zones 6, 7. In the external zone 6, although the nonwoven material of the nonwoven layer 2 is present in a compressed state, it is not present in a molten state and/or is not present in a completely melted state. A form-fitting composite of solidified elastic material and nonwoven material does not necessarily have to be present in the outer zone 6.

In the inner zone 7 of the connecting regions 4, a form-fitting composite of solidified elastic material and nonwoven material is present. In this case, the nonwoven material does not have to be molten, but the fibers can merely have been pressed into the elastic melt, with the result that a form-fitting composite is present after the elastic layer 1 has solidified. As an alternative, it is possible for at least individual fibers of the nonwoven material to be molten in the inner zone 7. It is also possible that the nonwoven material is present in a completely molten state in the elastic melt in the inner zone 7. In all cases, a form-fitting composite of nonwoven material and solidified material of the elastic layer 1 is present after the elastic material has solidified in the inner zone 7.

The trilaminate illustrated in the FIGURE is connected together between a roller pair, in the case of which, from above when looking at the drawing, a profiled roller with elevations presses the nonwoven layer 2 into the elastic layer 1 and, from below when looking at the drawing, a counter roller with a smooth surface is arranged. When producing the laminate illustrated in FIG. 1, a cooling roller is used as counter roller. The cooling roller is a steel roller. The structured roller, which acts from above, is a non-cooled roller of a rubber-like material.

The rollers used for the connection are operated with a spacing. A fixed spacing is set between the cooling roller and the rubber roller. Said spacing is at least 20% of the thickness of the three combined layers 1, 2, 3.

Connecting regions 8 are situated opposite the connecting regions 4. The former are shaped in that the pressure of the elevations of the profiled roller, which presses the nonwoven layer 2 into the elastic layer 1, propagates and thus presses the elastic layer 1 into the nonwoven layer 3 at the connecting regions 8. As a result, internal zones 9 are formed, in which nonwoven material is present in a form fit in solidified material of the elastic layer 1.

In this case, the nonwoven material does not have to be molten, but the fibers can merely have been pressed into the elastic melt, with the result that a form-fitting composite is present after the elastic layer 1 has solidified. As an alternative, it is possible for at least individual fibers of the nonwoven material to be molten in the inner zone 9. It is also possible that the nonwoven material is present in a completely melted state in the elastic melt in the inner zone 9. In all cases, a form-fitting composite of nonwoven material and solidified material of the elastic layer 1 is present after the elastic material has solidified in the inner zone 9.

The connecting regions 8 moreover have an external zone 10, in which although the nonwoven material of the nonwoven layer 3 is present in a compressed state, it is not present in a molten state and/or is not present in a completely melted state. A form-fitting composite of solidified elastic material and nonwoven material does not necessarily have to be present in the outer zone 10.

According to the invention, between the connecting regions 4, 8, the diaper element has regions 11, in which the fibers of the respective nonwoven layer 2, 3 to a predominant extent are not present in a melted state and/or in a molten state. It is possible for the fibers to be melted or molten only at the boundaries 5 of the elastic layer 1.

The proportion of the regions 11 on the overall surface of the laminate is preferably more than 10%, in particular more than 20%, preferably more than 30% and/or less than 60%, in particular less than 50%, preferably less than 40%.

In the external zones of the regions 11, the fibers of the nonwoven layers 2, 3 are thermally largely uninfluenced, since according to the invention the fibers have not experienced any thermal loading from the outside. Only a mechanical influence of the fibers due to the stretching in the transverse direction during the activation step is present in the regions 11.

The laminate preferably has a specific weight per unit area of more than 10 $g/m^2$, in particular more than 30 $g/m^2$, preferably more than 40 $g/m^2$ and/or less than 400 $g/m^2$, in particular less than 300 $g/m^2$, preferably less than 200 $g/m^2$. In a particularly advantageous embodiment of the invention, the weight per unit area is between 50 and 150 $g/m^2$.

In the exemplary embodiment, the connecting regions 4, 8 and the non-connecting regions 11 are configured in the manner of strips, the strips running transversely to the tension direction of the diaper element. The strips have a width of between 0.5 mm and 2 mm. In the exemplary embodiment, the connecting regions 4, 8 and the non-connecting regions 11 have the same width and both have a width of 1.2 mm, with the result that the area percentage of the connecting areas 4, 8 with respect to the non-connecting regions 11 is the same.

The invention claimed is:
1. An elastic diaper element, comprising:
an elastic layer (1);
outer layers (2, 3) of nonwoven; and
connecting regions (4, 8) that connect the outer layers (2, 3) to the elastic layer (1), the connecting regions (4, 8) comprise zones (7, 9) that include a form-fitting composite of nonwoven material of the outer layers (2, 3) and solidified material of the elastic layer (1) that is located only at regions of boundaries (5) between the outer layers (2, 3) and the elastic layer (1) and the solidified material that forms the connecting regions does not extend through the elastic layer (1);

wherein the connecting regions (4, 8) are less than 90% of an overall surface and more than 20% of the overall surface.

2. The elastic diaper element as claimed in claim 1, wherein the connecting regions (4, 8) are less than 70% of the overall surface.

3. The elastic diaper element as claimed in claim 1, wherein arranged between connecting regions (4, 8) are regions (11) in which the form-fitting composite of the nonwoven material and the solidified material of the elastic layer (1) are predominantly not present.

4. The elastic diaper element as claimed in claim 1, wherein the connecting regions (4, 8) have external zones (6, 10) in which the nonwoven material of the outer layers (2, 3) is present in a compressed state but not in at least one of a completely melted or molten state.

5. The elastic diaper element as claimed in claim 1, wherein one of the outer layers (3) is formed of a carded nonwoven fabric, and the nonwoven fabric preferably has a specific weight of 10 to 40 g/m$^2$.

6. The elastic diaper element as claimed in claim 1, wherein one of the outer layers (2) is formed of a waterjet-bonded nonwoven fabric, and the nonwoven fabric preferably has a specific weight of 10 to 70 g/m$^2$.

7. The elastic diaper element as claimed in claim 1, wherein the elastic layer (2) is formed of a polypropylene-polyethylene block copolymer, and the elastic layer has a specific weight of 10 to 100 g/m$^2$.

8. A method for producing a laminate for elastic diaper elements, comprising the following steps:

extruding an elastic film layer (1) between two layers of nonwoven (2, 3), connecting the layers (1, 2, 3) via connecting regions (4, 8) to form a laminate between rollers, wherein at least one of the rollers has elevations, and the connecting regions (4, 8) comprise zones (7, 9) that include a form-fitting composite of the two layers of nonwoven (2, 3) and solidified material of the elastic film layer (1) that is located only at regions of boundaries (5) between the outer layers (2, 3) and the elastic layer (1) and the solidified material that forms the connecting regions does not extend through the elastic layer (1), wherein the connecting regions (4, 8) are less than 90% of an overall surface and more than 20% of the overall surface.

9. The method for producing a laminate as claimed in claim 8, wherein at least one of the rollers is a cooling roller, and the method further comprises cooling the laminate with the cooling roller.

10. The method for producing a laminate as claimed in claim 8, wherein at least one of a), in one of the nonwoven layers (3), during an activation, internal bonding points between fibers are broken up, or another of the nonwoven layers (2) remains as a functional, load-bearing nonwoven layer (2) and undergoes a transverse orientation.

11. The method as claimed in claim 8, wherein the elevations of the roller have a height of at least one of more than 100 μm or less than 1.8.

12. The method as claimed in claim 8, further comprising extending the laminate in a transverse direction to a wide enough extent that, for one of the nonwoven layers (3), an elongation at break is exceeded.

13. The method as claimed in claim 12, further comprising extending the laminate in a transverse direction such that, for another of the nonwoven layers (2), the elongation at break is not reached.

14. The method as claimed in claim 8, wherein the laminate comprises an elastic diaper element.

15. The method as claimed in claim 14, wherein the elastic diaper element is a diaper ear or diaper waistband.

16. The method of claim 12, wherein the elongation at break is exceeded by more than 20%.

* * * * *